United States Patent
de Peña

(10) Patent No.: US 6,866,360 B2
(45) Date of Patent: Mar. 15, 2005

(54) PRINTER AND A METHOD OF PRINTING

(75) Inventor: Sascha de Peña, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/285,347

(22) Filed: Oct. 30, 2002

(65) Prior Publication Data

US 2003/0112282 A1 Jun. 19, 2003

(30) Foreign Application Priority Data

Oct. 31, 2001 (EP) ............................................. 01650130

(51) Int. Cl.⁷ ............................ B41J 29/393; B41J 2/15
(52) U.S. Cl. ........................................... 347/19; 347/41
(58) Field of Search ................................ 347/19, 41, 14

(56) References Cited

U.S. PATENT DOCUMENTS 6,109,723 A * 8/2000 Castle et al. .................. 347/19

FOREIGN PATENT DOCUMENTS

| EP | 0 430 451 A2 | 6/1991 | |
|---|---|---|---|
| EP | 0 729 838 A1 | 9/1996 | |
| EP | 0 979 734 A1 * | 5/1999 | ............. B41J/2/21 |
| WO | 00/30856 | 6/2000 | |

* cited by examiner

Primary Examiner—Stephen D. Meier
Assistant Examiner—Alfred Dudding

(57) ABSTRACT

A printer comprises a scan axis (14) arranged to receive at least one pen (10), each pen comprising an array of ink ejection elements (20,22) adapted to print a swath on a printing medium. Printer control circuitry is responsive to selection of a multi-pass print mode, to cause a printing medium advance mechanism to incrementally advance the printing medium (26) past the pens in a printing advance direction (PAD) between the printing of a first swath and a second swath. Thus, a first group of ink ejection elements dispenses ink in a swath along respective rows on the printing medium with at least one other group of corresponding ink ejection elements dispensing ink along those rows in subsequent swaths. The printer control circuitry is further arranged to cause the first group of ink ejection elements to dispense proportionally more ink per swath than the other groups of ink ejection elements in subsequent swaths.

14 Claims, 6 Drawing Sheets

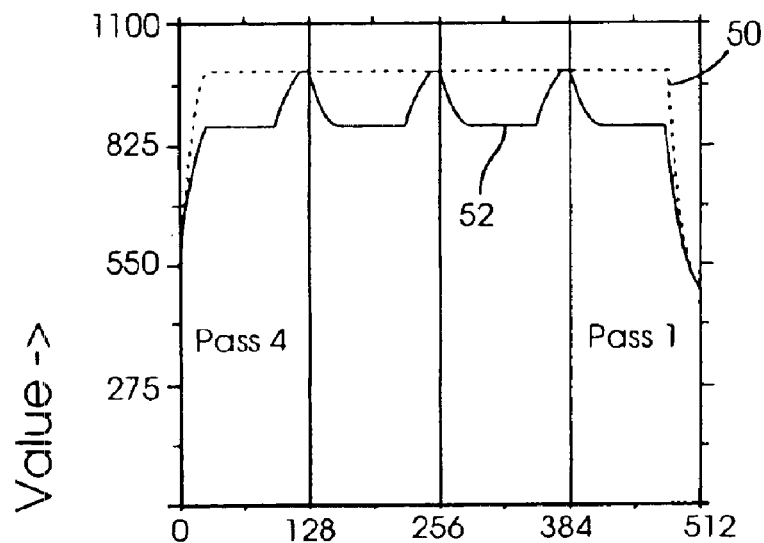
Fig. 5(a) Prior art 4 PASS print mode
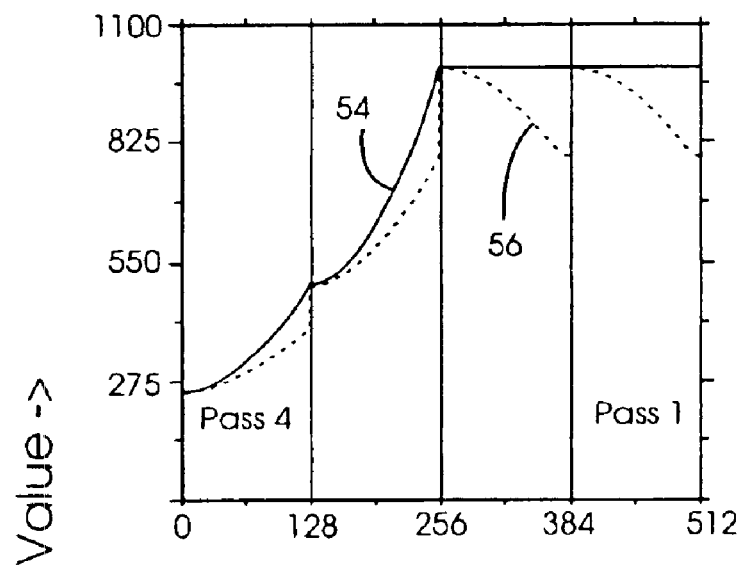
Fig. 5(b) New 4 PASS print mode

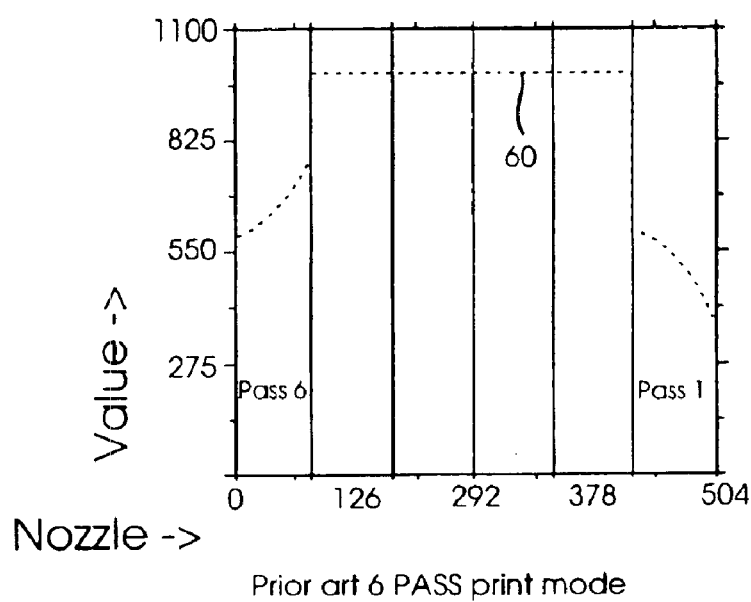
Fig. 6(a) Prior art 6 PASS print mode
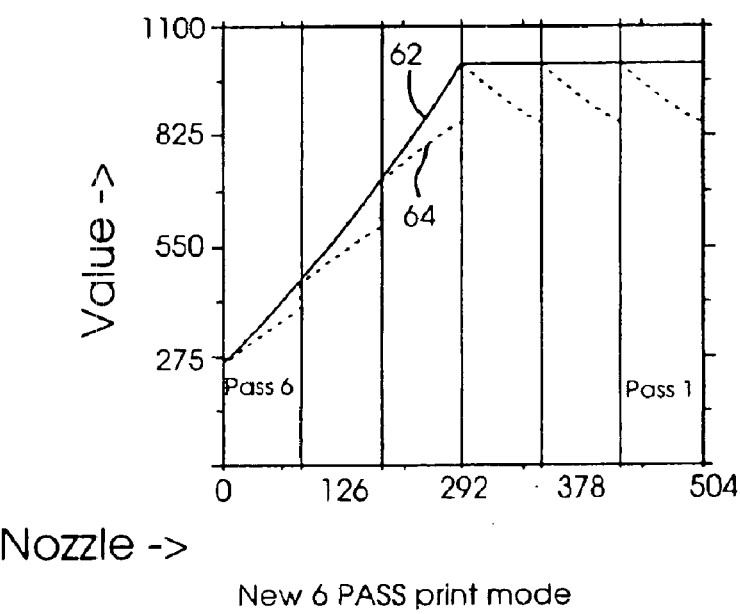
Fig. 6(b) New 6 PASS print mode

PRINTER AND A METHOD OF PRINTING

FIELD OF THE INVENTION

The present invention relates to a printer and a method of printing to mitigate differential banding along a scan axis (DBASA) of a print head.

BACKGROUND

Printers such as inkjet printers generally employ printheads which are mounted on a scan axis for printing in a swath across a sheet of a print medium. The print medium, whether or not of paper, may be referred to herein as a "page" for simplicity, although any print-receiving medium is encompassed by this term whether in page format, in the form of an endless web, or in the form of an article such as an envelope which is fed through the printer).

The page is incrementally advanced through the printer in a direction perpendicular to the scan axis (the direction of paper movement is known as the "media axis" or as the printing advance direction or the paper axis directionality or "PAD", and the terms are used interchangeably herein). Between each incremental advance a swath of ink is deposited on the paper.

When an image is sent to the printer, the printing software generates an image mask in which the image is split into swaths of a height equal to the height of the printhead. FIG. 1 shows a print carriage of the type used in the Hewlett-Packard DesignJet 5000 printer. Six print cartridges 10 are mounted on a carriage 12 which travels along a pair of parallel rails 14 defining a scan axis. The carriage is driven by a belt 16 along the scan axis. The belt is driven by a motor mounted within the printer (not shown) and a set of off-board ink reservoirs feed ink to the individual print cartridges 10 via a set of six flexible tubes (not shown) whereby each printhead can be supplied with a different coloured ink (e.g. dark cyan, light cyan, dark magenta, light magenta, yellow and black).

Each print cartridge 10 supplies ink to a printhead or pen 18 comprising a linear array of nozzles, in this case arranged in two parallel staggered rows 20,22, running in the direction of the media axis.

In use the printer software converts images to be printed into an image mask of pixels of the six different colours. High quality colour hues can be printed by an appropriate mix of coloured dots laid alongside or on top of one another. In a 600 dpi (dot per inch) print mode, therefore, each square inch of the image will be pixelated into a 600×600 grid, and each point of the paper will either be left blank or will receive a droplet of ink from one or more of the pens. The manner in which the droplets are laid down is specified in the print mode.

In a low quality but high speed single pass print mode, the image mask is divided into a series of swaths running parallel to the scan axis. The paper advances in steps in the printing advance direction (PAD). As each successive swath of paper is located under the path of the print carriage, the carriage scans across the scan axis and the individual nozzles within the pens fire in a timed sequence to deposit drops of the relevant coloured inks onto the paper in the positions called for by the image mask.

Thus, whenever a drop of dark cyan ink is specified in this strip, the appropriate nozzle is caused to fire as it passes over that point in the page. The entire swath receives its full image in a single pass and the page is then advanced before the adjoining swath is printed.

Single pass print modes, in particular, suffer from boundary matching—a problem caused by imperfectly fabricated end nozzles on a print head overlapping (or not) from swath to swath. One way to mitigate this problem and also to improve other quality attributes is to use multi-pass print modes explained below.

FIG. 2 illustrates a prior art two-pass print mode and a prior art eight-pass print mode. Dealing first with the two pass print mode, indicated generally at 24, a sheet of paper 26 is fed through a printer (not shown) past print carriage 12, which is shown schematically as an array of six parallel pens 18, in the PAD (indicated by arrow 28). The print carriage 12 is also shown during a second pass 12' and a third pass 12". In the first pass shown, the pens 16 print a swath of height with the top of the swath being denoted by dotted line 30 (line 30 is also marked with the number "1" to indicate that this is nominally the first of two passes), and the bottom of the swath being denoted by dotted line 32. The printer software subdivides the pixels forming the swath of image between lines 30 and 32, so that half of the pixels in any given region are printed during one of two passes. Thus, when carrying out this first pass the pens 18 will print half of the image content between the lines 30 and 32.

The paper then advances half a swath length so that the top of the pens (now shown as 18') in the print cartridge 12' lie along line 34 (also marked "2" to denote that it is the top boundary of the second of two passes). The print cartridge 12' traverses the scan axis parallel to line 34 and the pens 18' print both the second half of the image between the lines 34 and 32 and half of the pixels required for the image in the half swath length below line 32 (i.e. again the pens 18' are printing a full swath corresponding to their full height). The paper then advances so that the top of the pens 18" lie at line 32 and they print a further full-height, half-content swath, completing the image in the half swath length below line 32, together with the first half of the pixels in the half swath length below that. In this way the printhead prints the entire image in swaths, with the lower half of each swath being printed on fresh paper (or whatever other print media is being employed) and the upper half of each swath being printed over part of the image which was printed during the previous pass.

Thus, the lower nozzles of each pen continually print on blank paper in each pass to provide an image with 50% of the required ink droplets, whereas the upper nozzles always print over the 50% completed image printed by the lower nozzles in the previous pass (which, due to the page advance, are located under the upper nozzles having advanced a half swath length).

Although the print carriage is shown at or towards the left of the page 26 for each pass, in practice the carriage will print alternate scans from the left and right to increase throughput by taking advantage of the end point of carriage travel during the previous scan.

FIG. 2 also illustrates a further multi-pass print mode, in this case comprising 8 passes, indicated generally at 36. The carriage has been further simplified for the eight-pass print mode as a block of six pens 18, and is shown in the position relative to the paper for each of eight successive passes (with the position of the top of the pens after each page advance being indicated by the lines 1,2,3,4,5,6,7,8,1).

In a multi-pass print mode, the paper advances between each pass through a fraction of the swath height, in the example ⅛th. In order for the swaths to match up (and since the total number of nozzles may not be equally divided between the number of passes), it is common to cause the paper to advance by a distance corresponding to the length of an integer quotient of the total number of nozzles divided by the number of passes. In this way the remainder number of nozzles are left redundant in this print mode. In each pass the set of six printheads 24 print a full height swath (except the redundant nozzles) as described above but with the important difference that each swath prints only a fraction of the pixels required for the image mask of that swath. Thus each fraction of the swath height, e.g. the distance between any two of the adjacent lines 1,2,3,4,5,6,7,8,1, receives its complete complement of ink droplets over, in this case, eight passes.

The printer control software is therefore adapted, in a known manner, to generate instructions causing the printheads to print a series of swaths each containing a fraction of the image content. This fraction is defined in a print mask setting out the pixels which are to be printed in each pass.

So in a single-pass print mode, all pixels in the mask are employed in each pass. In two-pass print mode, a checkerboard type mask is employed, typically so that diagonally connected pixels are printed in a first pass and their complementary diagonally connected pixels are printed in the second pass. Thus, in each pass a drop is being deposited on a pixel which may have up to four adjacent pixels which have been printed in the previous pass. Four-pass print mode, may either operate by employing a ¼ filled mask and advancing ¼ of the swath length in each pass; or alternatively, by using a two-pass type mask to fire two dots per pixel. The latter option means less ink is deposited in each pass, so drying faster and allowing a saturation amount of ink to be deposited on a given pixel over two passes. It will be seen by extension that in an 8-pass print mode, the mask can be defined so that in any given pass, a drop need not be fired onto a pixel which has been printed in an immediately previous pass, so ensuring that the medium is completely dry when printed on.

In general, a higher number of passes is used to provide a better quality image and, due to the fact that each area of the paper is printed in a number of passes, a higher fidelity image can be obtained. However this normally results in a slower print job, due to the fact that the paper is advancing only a smaller fraction of the active pen height between passes.

Thus, many printer designers will often attempt to implement a high quality print mode by using say a four or six pass print mode rather than 8 pass mode. To attempt to increase throughput in such print modes, it is usual to attempt to employ the fastest possible print head speed over the scan axis, however, as explained below this can result in problems.

In any printer, dot penetration and dot gain affect the perceived color of a printed image. They are highly dependent on the media surface conditions encountered by the ink. Absorption of the ink into the media reduces the light filtering capability of the dot. The more the colorant is confined to the paper's surface, that is, the smaller the dot penetration, the most saturated the color appears due to decreased light scattering and absorption within the media. Conversely, if the colorant is spread through a thick layer—great dot gain—the image loses saturation due to decreased colorant density.

Relaxation time is the time required for ink to dry into a given medium and FIG. 4 illustrates a typical time-dryness function indicated by the numeral 40. In this case, the relaxation time ($RT_1$) is relatively short. The time interval between consecutive drop placements (drop-to-drop interval) is usually determined according to the surface conditions found by a second drop on the same dot or in some cases a drop on adjacent dots.

In multi-pass print modes, ink is usually laid down with a drop-to-drop interval (DT) slow enough to ensure that droplets of any particular colour of ink are directed onto a region of paper which is relatively dry.

Thus, as long as this time exceeds the relaxation time (RT) for the ink-medium, the drops will encounter almost the same conditions along the entire print swath, i.e. a relatively small change in dryness ($\delta d$), resulting in an homogeneous color perception. However, especially fast bi-directional print modes involve drop-to-drop intervals less than the typical relaxation times and with a maximum variation in drop-to-drop time ($DT\delta$) for any two drops. When the drying time of the ink is relatively fast, this means that the maximum change in dryness ($\delta_1$) any two drops may find on the medium can be quite large. Thus, following drops can find very different initial surface conditions along the swath, and this leads to a variation of dot penetrations and gains along the scan axis, and thus to a changing color saturation. In other words, when the carriage has just finished a swath and turns around to start printing in the opposite direction, it is printing on a relatively wet medium, but as it continues along the same swath, the medium is increasingly relatively dry. The related variation in spot size when printing on wet media vs. dry media constitutes the main cause of degradation in image quality in bi-directional print modes and is referenced herein as differential banding along scan axis (DBASA).

It will he seen that DBASA problems do not arise in single pass print modes as the print head does not deposit ink over an area printed in an immediately previous pass—nonetheless these modes and lower pass print modes suffer from boundary banding and other quality limitations.

For intermediate, multi-pass print modes, the typical solution for DBASA has historically been to increase the number of passes as well as giving the ink the chance to dry before the adjacent dots are laid down onto the page.

Thus, it will also be seen that for very high pass print modes, for example, 8 pass, in any given pass a dot need not be deposited adjacent a dot deposited in an immediately previous pass, thus (at current nozzle densities) DBASA problems do not arise in such print modes.

However, because of the lesser number of passes required, it is always preferable to use fewer passes for the same print quality. Thus, it is preferable to use from 2 to 6 or so pass print modes for high quality printing. If, however, the print head moves quickly along the scan axis, so reducing the drop-to-drop interval, DBASA problems can arise. If the print head is set to move slower, then the throughput advantages of employing fewer passes are lost.

Other alternative solutions include switching to unidirectional print modes with the same number of passes or introducing dry times after each swath to reduce DBASA. Again however, these different approaches are trade-offs rather than a solution, since printing times and throughput are adversely affected.

It is also known to employ N pass print modes with N/2 advances, thus repeating each swath in both print directions to reduce DBASA. Though in principle this solution does not affect the throughput and is extensible to print modes with few passes, it must be balanced against the boundary banding problems prevalent in lower pass print modes.

So eventually, and for a low number of passes, a trade-off has to be made between boundary banding and DBASA, the former being less visible from a certain distance.

Because DBASA becomes evident when drop-to-drop intervals are in the order of magnitude of the paper/ink interaction relaxation times, other attempts to solve this problem have gone into reducing relaxation time. One such alternative comprises forcing ink drying and this has no impact on throughput. Nonetheless, such solutions are difficult to implement mechanically and so are unattractive to produce.

Moreover, as DBASA is primarily an ink/medium defect, it can also be concealed by changing the print medium. Thus, when printing on a medium which has different ink/media characteristics than the most affected coated media, there may be no noticeable DBASA artefact.

So while current solutions have focused on reducing the relaxation times well below the drop-to-drop intervals (dryer, increased number of passes) or delaying the swath in order to encounter homogenous paper conditions, they remain insufficient for increasing throughput conditions with fewer-pass print modes.

European Patent Specification EP 0 979 734 A1 discloses a multi-pass ink jet printer in which a first group of ink injection elements deposit more ink along respective rows of a printing medium during a first swath than that deposited by a second group along the same rows in a subsequent swath. However, the reason for this is to avid color shifts in the case of composite colors, and the specification is completely silent with respect to drop-to-drop intervals and relaxation times as hereinafter discussed.

DISCLOSURE OF THE INVENTION

This invention provides a printer and method of printing to minimize DBASA by controlling ink-media relaxation time.

In one aspect the invention provides a printer comprising:
a scan axis arranged to receive at least one pen, each pen comprising an array of ink ejection elements adapted to print a swath on a printing medium; and
printer control circuitry, responsive to selection of a multi-pass print mode, to cause a printing medium advance mechanism to incrementally advance the printing medium past the pens in a printing advance direction (PAD) between the printing of a first swath and a second swath so that, in use, a first group of ink ejection elements dispenses ink in a swath along respective rows on said printing medium with at least one other group of corresponding ink ejection elements dispensing ink along said rows in subsequent swaths, said printer control circuitry further causing said at least one pen to move across said printing medium at a speed providing a pre-determined drop-to-drop interval and said scan axis being arranged to receive one of said at least one pen which dispenses an ink with a relaxation time which is a function of the characteristics of said printing medium and the amount of ink being dispensed;
said printer control circuitry being arranged to cause said first group of ink ejection elements to dispense proportionally more ink per swath than said other group(s) of ink ejection elements in subsequent swaths; and
said drop-to-drop interval being comparable to said relaxation time.

In another aspect the invention provides a printer comprising:
a scan axis arranged to receive at least one pen, each pen comprising an array of ink ejection elements adapted to print a swath on a printing medium; and
printer control circuitry, responsive to selection of a multi-pass print mode, to cause a printing medium advance mechanism to incrementally advance the printing medium between swaths;
wherein said printer control circuitry is arranged to cause said ink ejection elements to dispense ink in a swath so that other ink ejection elements in subsequent swaths dispense ink onto rows on said printing medium having near homogeneous conditions of dryness.

In a still further aspect the invention provceds a printer comprising:
a scan axis arranged to receive at least one pen, each pen comprising an array of ink ejection elements adapted to print a swath on a printing medium; and
printer control circuitry, responsive to selection of a multi-pass print mode, to cause a printing medium advance mechanism to incrementally advance the printing medium past the pens between swaths;
said printer control circuitry being arranged to move said at least one pen across said printing medium at a speed providing a pre-determined drop-to-drop interval and wherein said scan axis is arranged to receive one of said at least one pen which dispenses an ink with a relaxation time being a function of at least the characteristics of said printing medium and the amount of ink being dispensed; and
wherein said printer control circuitry controls the amount of ink being dispensed to ensure said relaxation time is greater than said drop-to-drop interval.

The invention further provides a method of printing with a printer of the type comprising a scan axis arranged to receive at least one pen, each pen comprising an array of ink ejection elements, wherein the method comprises the steps:
responsive to selection of a multi-pass print mode, causing a printing medium advance mechanism to incrementally advance the printing medium past the pens in a printing advance direction (PAD) between the printing of a first swath and a second swath so that a first group of ink ejection elements dispenses ink in a swath along respective rows on said printing medium with at least one other group of corresponding ink ejection elements dispensing ink along said rows in subsequent swaths;
moving said at least one pen across said printing medium at a speed providing a pre-determined drop-to-drop interval, said at least one pen dispensing an ink with a relaxation time which is a function of the characteristics of said printing medium and the amount of ink being dispensed and said drop-to-drop interval being comparable to said relaxation time; and
causing said first group of ink ejection elements to dispense proportionally more ink per swath than said other group(s) of ink ejection elements in subsequent swaths.

The invention also provides a computer program product comprising printer control software for controlling a printer of the type comprising a scan axis arranged to receive at least one pen, each pen comprising an array of ink ejection elements, wherein the program comprises instructions effective to cause the printer to perform the steps:
responsive to selection of a multi-pass print mode, causing a printing medium advance mechanism to incrementally advance the printing medium past the pens in a printing advance direction (PAD) between the printing of a first swath and a second swath so that a first group of ink ejection elements dispenses ink in a swath along respective rows on said printing medium with at least one other group of corresponding ink ejection elements dispensing ink along said rows in subsequent swaths;

moving said at least one pen across said printing medium at a speed providing a pre-determined drop-to-drop interval, said at least one pen dispensing an ink with a relaxation time which is a function of the characteristics of said printing medium and the amount of ink being dispensed and said drop-to-drop interval being comparable to said relaxation time; and causing said first group of ink ejection elements to dispense proportionally more ink per swath than said other group(s) of ink ejection elements in subsequent swaths.

The computer program product may be embodied in the firmware of a printer, in a piece of software installed on a computer which controls the printer, or it may be split between both.

The present invention minimizes the root cause of DBASA for multi-pass print modes with an approach directly opposed to the existing ones, namely increasing ink-media relaxation times, thus forcing subsequent passes to print on an always wet medium.

The embodiment provides a proven way to minimize the DBASA problem for print modes with few passes by controlling the ink coalescence, in the preferred embodiment, by means of print mode ramp definitions.

In the preferred embodiment, print mode ramp definitions are optimized independently for different color pens.

It will be seen that the invention is operable in print modes both where pen nozzles dispense 1 dot per pixel or where corresponding nozzles dispense 2 or more dots per pixel.

BRIEF DESCRIPTION OF THE DRAWINGS

Embodiments of the invention will now be described with reference to the accompanying drawings, in which:

FIGS. 5(a) and 6(a) illustrate ramp definitions employed by prior art printers; and FIGS. 5(b) and 6(b) illustrate ramp definitions employed by printers according to preferred embodiments of the present invention.

DESCRIPTION OF THE PREFERRED EMBODIMENT

Figure 1:
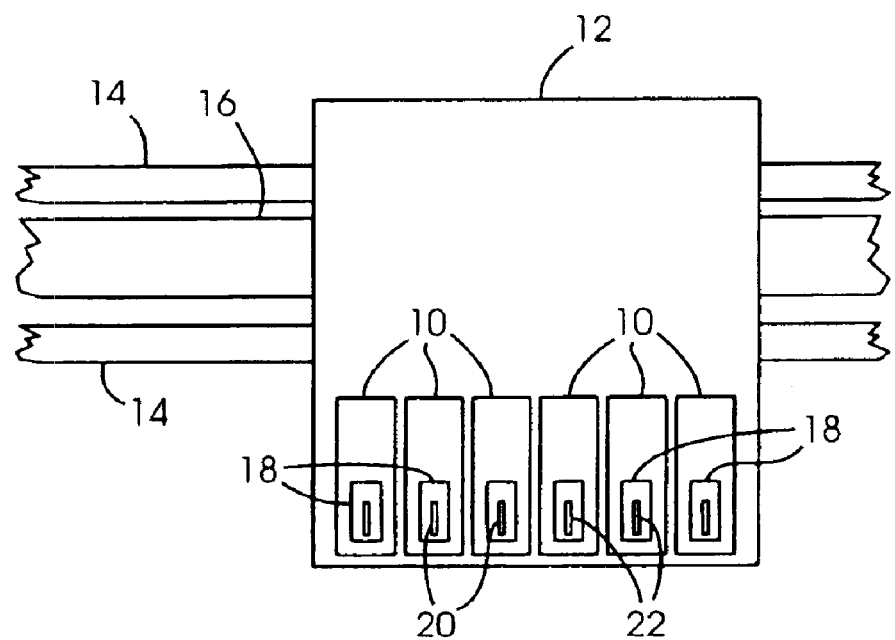
FIG. 1 is a plan view of a prior art print carriage and associated print heads mounted on a pair of scan rails.
Figure 2:
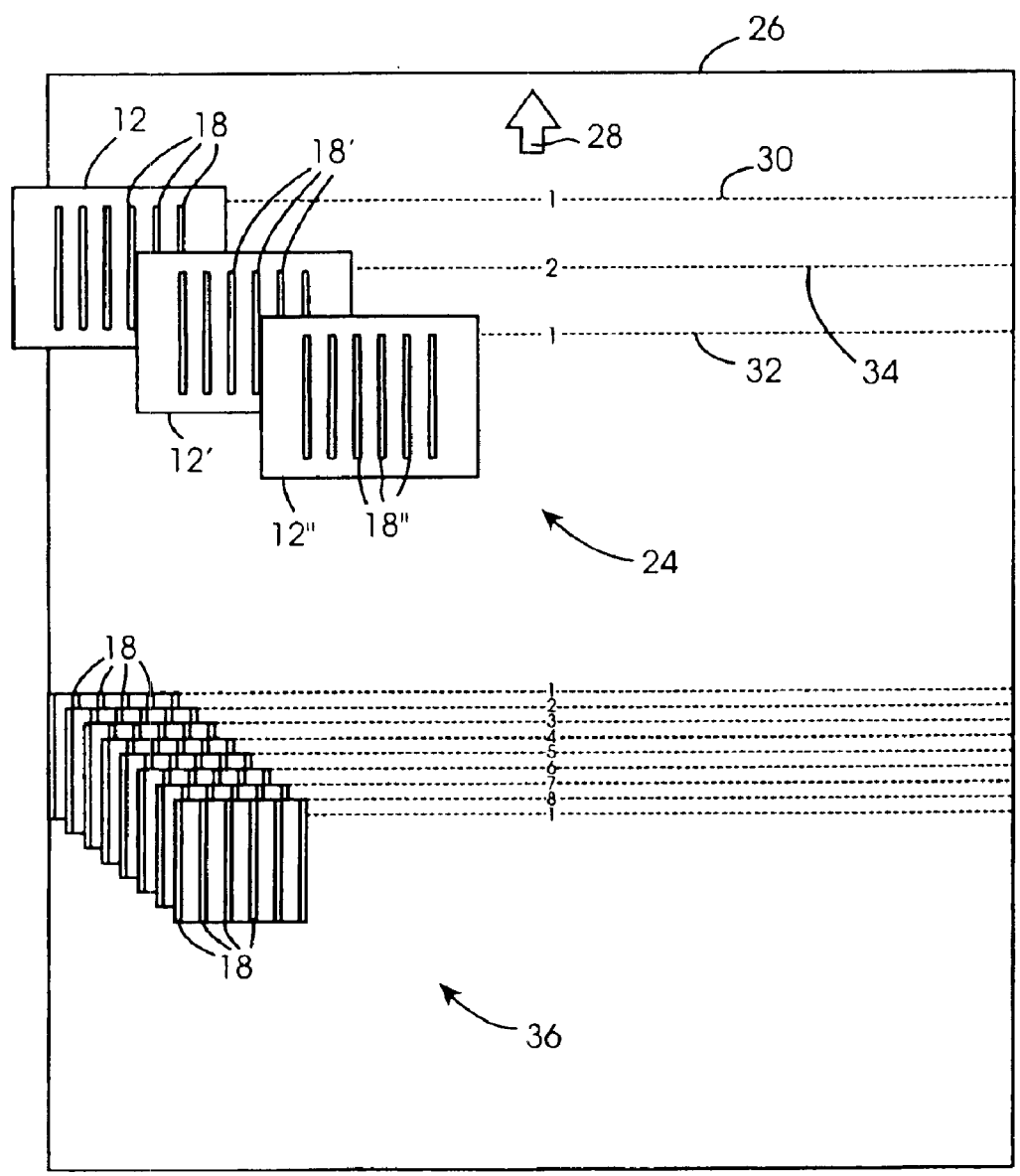
FIG. 2 is an explanatory diagram of prior art two-pass and eight-pass print modes.
Figure 3:
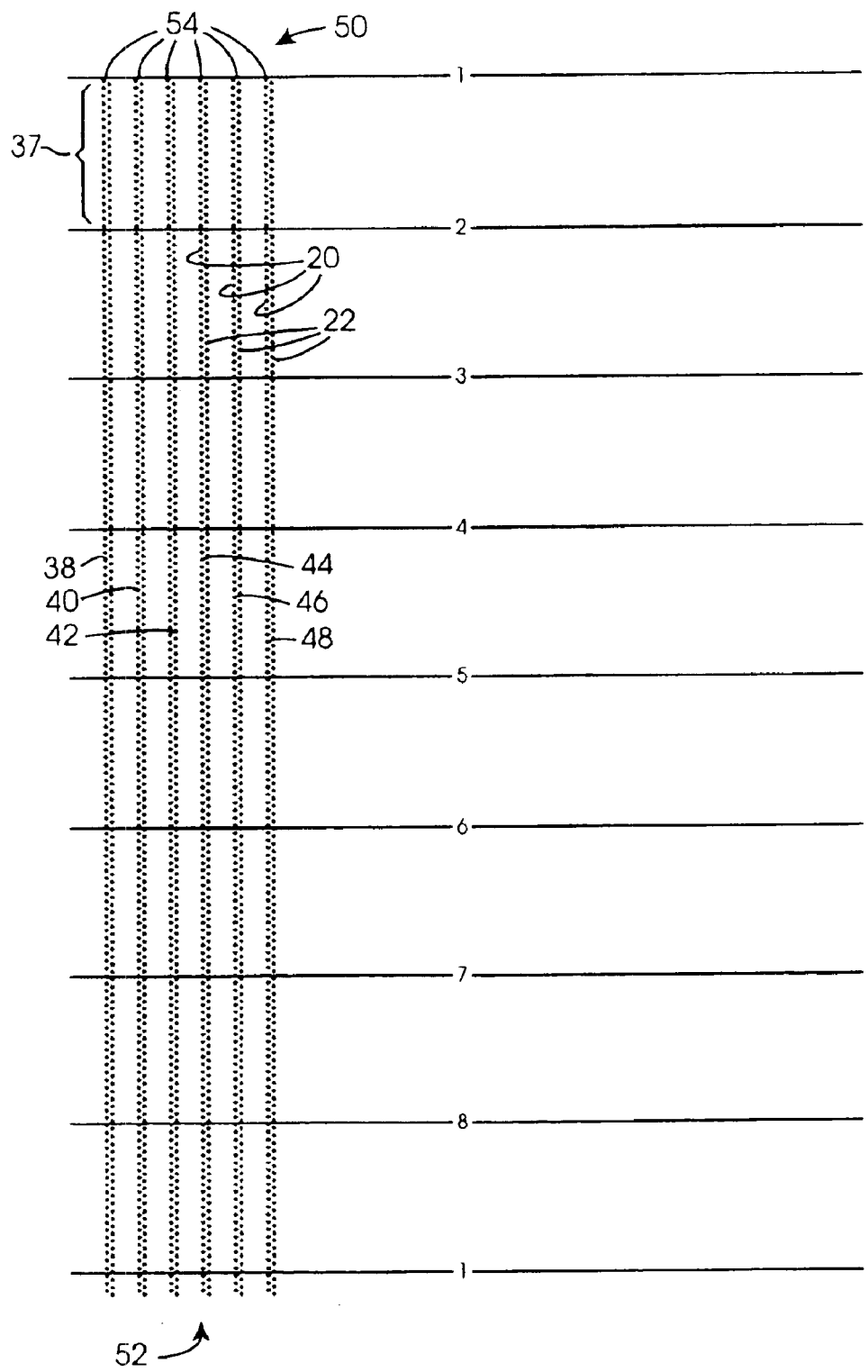
FIG. 3 is an enlarged view of a prior art nozzle configuration and its use in an eight-pass print mode.

As mentioned above, boundary banding is particularly evident in lower pass print modes. Apart from increasing the number of passes, another technique used to mitigate this problem is to reduce the amount of ink being dispensed from nozzles disposed towards either end of the printhead.

It is therefore known to use a "ramp definition" to outline the proportion of ink to be dispensed by each nozzle as it passes over the medium.

FIG. 5(a) shows graphically, a ramp definition for a prior art four-pass print mode. In the present description the nozzles of a print head will be numbered from 0 up to 504/512 (depending on the number of passes), with the highest numbered or leading nozzles printing in the first pass and the lowest numbered or trailing nozzles being nozzles which print in the last pass.

Numeral 50 indicates an initial profile which, as can be seen, causes the amount of ink to be dispensed from trailing nozzles 1 to 32 and leading nozzles 481 to 512 in a row of nozzles to gradually decrease from a nominal value for the intermediate nozzles 33 to 480. It will be seen, however, that to compensate for the lesser amount of ink dispensed by the nozzles at the extreme ends of the print head, a correspondingly greater amount of ink needs to be dispensed by intermediate nozzles passing over the same pixels in $2^{nd}$, $3^{rd}$ and $4^{th}$ passes in the case of leading nozzles 481–512 and in $1^{st}$, $2^{nd}$ and $3^{rd}$ passes in the case of trailing nozzles 1–32. Thus, for nozzles 160–128, 288–256 and 416–384 the amount of ink needs to be gradually increased to compensate for the lower amount of ink dispensed by nozzles 1 to 32 and for nozzles 95–127, 223–255 and 351–383 the amount of ink needs to be gradually increased to compensate for the lower amount of ink dispensed by nozzles 481 to 512. Thus, the initial profile 50 is pre-processed to generate the profile indicated by numeral 52. It will be seen that, in the profile 52, each of the gradients is quadratic in nature, with some being positive and others being inverse. The ramp definition for the initial profile therefore includes parameters including the nominal values, i.e. 500, 1000, at each intermediate nozzle in the profile, i.e. nozzle 1, 32, 480 and 512, as well as a respective shape parameter indicating the nature of the gradient around the intermediate nozzle. It is these parameters which are then interpreted and employed to generate the pre-processed profile 52. This pre-processed profile 52 is in turn employed to generate the final print mask for the print mode.

If for example, a completely flat ramp definition were employed, then a four pass print mask could simply be implemented by having a nozzle print every fourth pixel in a row, shifted by one pixel for each pass of the corresponding nozzles. However, because the distribution of ink to be dispensed by corresponding nozzles is not even and in most cases, not easily divisible by the number of passes, print mask patterns may extend across many pixels to accommodate this complexity. So, for example, a pattern may extend across 100 pixels with a first nozzle dispensing ink in a pattern on 17 of the pixels, the next two corresponding nozzles dispensing ink in respective patterns on 33 of the pixels, and the last corresponding nozzle dispensing ink on the last 17 of the pixels.

In the preferred embodiments of the present invention, the print mode ramp definition is employed to control the paper moisture in an attempt to mitigate DBASA problems. This is based on the knowledge that diffusion and capillarity are the main contributors to the paper/ink relaxation time and so the ink absorption characteristics of the cellulose fibres comprising most print media heavily depend on the amount of ink already absorbed. Thus, contrary to the approach of prior art solutions, in the preferred embodiments, ink relaxation time is increased to mitigate DBASA problems.

Figure 4:
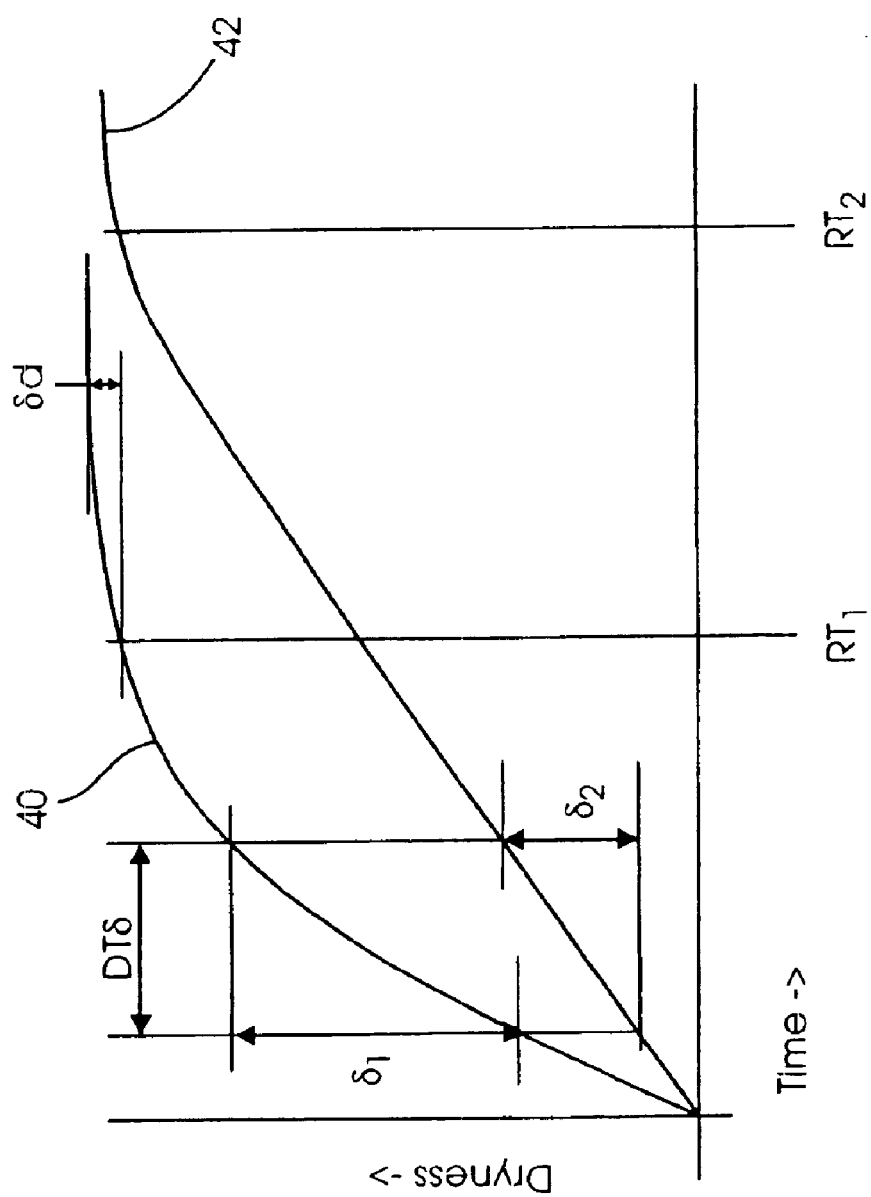
FIG. 4 is a graph of ink dryness versus time.

Referring again to FIG. 4 to illustrate the point, a second time-dryness function indicated by the numeral 42 is shown. In this case, the relaxation time ($RT_2$) is relatively long compared to the time $RT_1$. Thus, with the printer cartridge operating at the same high speed as before, the maximum change in dryness ($\delta_2$) would be much reduced vis-a-vis the change in dryness $\delta_1$. This in turn means that print medium conditions experienced by any two drops in a print swath will be much more similar than before and as such DBASA problems would be mitigated.

The aims of the invention can be achieved through a ramp definition such that:

the first swath deposits enough ink for the next pass to see a wet surface along the entire swath length; and the ink amount laid down in subsequent passes is constrained to maintain the moisture content of the media constituted with the first pass.

In other words, the moisture content of the media is kept at a level high enough to produce no significant moisture gradient during the next swath. This provides constant relaxation times and nearly homogeneous conditions (moisture and paper expansion) for all passes.

In a first embodiment of the invention, FIG. 5(b), the ramp definition is defined with an initial profile as indicated by the numeral 54. For the third and fourth passes, where ink is dispensed by nozzles 129–256 and 1–128 respectively, the initial profile is such that the amount of ink dispensed rises quadratically from a lowest nominal value set for nozzle 1 to nozzle 128, and quadratically from an intermediate nominal value set for nozzle 128 to nozzle 256. For the first two passes where ink is dispensed by nozzles 257–512, the amount of ink dispensed is set to the same high nominal level as previously. This initial profile including the shape parameters is then pre-processed as before to produce the pre-processed profile 56.

In this case, it can be seen that, to mitigate boundary matching problems, the nozzles at either end of the print head are again dispensing relatively less ink than their counterparts and that again the intermediate nozzles are dispensing more ink to compensate. More importantly, however, it will be seen that because the ink dispensed in the first two passes is relatively greater than the latter passes, the print media conditions experienced in $2^{nd}$, $3^{rd}$ and $4^{th}$ passes will be relatively more homogeneous than before.

It is also noted that the integral of the profile 56 is shown as being less than the integral of the corresponding prior art profile 52. However, the print mask generation process normalises these profiles to ensure that the same overall amount of ink is dispensed from profile to profile.

So referring back to FIG. 4, it will be seen that, using the ramp definition of FIG. 5(a), the relaxation time for the ink being dispensed after the first pass may be thought of as being derived from the function indicated by the numeral 40. Whereas, using the ramp definition of FIG. 5(b), the relaxation time for the ink being dispensed after the first pass may be thought of as being derived from the function indicated by the numeral 42. Thus the change in ink dryness ($\delta_2$) across the scan axis experienced by drops being dispensed in the second pass by a printer employing the ramp definition of FIG. 5(b) will be less than the change in dryness ($\delta_1$) experienced by drops being dispensed in the second pass by a printer employing the ramp definition of FIG. 5(a) so mitigating DBASA problems.

It should also be noted that, while less desirable, it is still possible to implement the invention without attempting to mitigate boundary matching problems. In this case, for example, the profile 54 could be used directly in the print mask generation process rather than using the profile 56 which mitigates both boundary matching and DBASA problems.

Turning now to FIG. 6(a) which illustrates a prior art ramp definition for a six pass print mode. In this case, both the initial profile and the pre-processed profile are co-incident and indicated by the numeral 60 as no further compensation for the gradients of the first and sixth passes needs to be made in the intermediate passes. Again, the amount of ink dispensed by the nozzles at the ends of the print head is significantly less than that dispensed by corresponding intermediate nozzles during the $2^{nd}$ to $5^{th}$ passes and so without needing to be pre-processed, the profile can be used to mitigate boundary matching problems.

In a second embodiment of the invention, FIG. 6(b), the ramp definition is indicated by an initial profile 62. This ramp definition includes the same nominal value for the first three passes and then a gradual drop across the profile for the next three passes. The initial profile with the ramp definition shape parameters is again pre-processed to produce a sawtooth profile 64. In this case, while the overall gradient of the pre-processed profile 64 follows the initial profile 62, the saw tooth gradient is reversed between the first three and the last three passes such that the trailing nozzles for the first three passes compensate for the reduced amount of ink dispensed by the trailing nozzles of the last three passes, and the leading nozzles of the last three passes compensate for the reduced amount of ink dispensed by the leading nozzles of the first three passes.

The pre-processed profile is then used in the generation of the print mask which when employed increases the amount of ink dispensed in the first three passes to maintain the moisture content of the print medium and so ensure improved homogeneity in print media conditions from pass to pass so mitigating the DBASA problems of the prior art.

Having described the above two embodiments, it will be seen that either the four or six pass print mode of FIG. 5(b) or 6(b) can be used in place of a 8 pass print mode, so producing improved throughput without suffering the DBASA problems of prior art 4 or 6 pass print modes exemplified by FIGS. 5(a) and 6(a).

The embodiments above have been described in terms of providing a ramp definition and employing the ramp definition to generate a print mask for use, in particular, in a high quality print mode. It will be seen that this may be implemented in any number of ways. For example, the ramp definition can be employed to generate the print masks at the design stage and have any print masks downloaded into printer control circuitry firmware. On the other hand, the ramp definition information could be held on board the printer and the print masks generated at run time. In either case, it will be seen that either future printers could be arranged to have their firmware updated to receive either new print mask information or new ramp definitions for any given print mode or indeed existing printers with such functionality could receive the new data required to benefit from the invention.

In terms of limitations of the invention, it is noted that the required moisture level can only be sustained for a small enough number of passes and a high enough amount of ink. However, as the DBASA artefact tends to show up in fully saturated secondary area fills and the invention applies to the optimization of print modes with an intermediate number of passes, the invention is ideally suited to this problem domain.

It is also noted that as the relaxation times are ink dependent, the embodiment is preferably implemented with individual printing ramp definitions for respective colored pens in a multi-pen printer. This is because in a multi-pen printer, the inks employed in the various pens differ from one another and in some cases the relaxation times may differ significantly. Thus, it may be the case that because its relaxation time does not cause DBASA problems, it is not necessary to implement the invention with a black pen, whereas the invention may be implemented on the other pens of the printer which would otherwise cause DBASA problems.

However, besides the DBASA reduction, the breakdown of the print mode ramp definitions into individual color contributors provides an additional flexibility that turns out to be a valuable influence on other ink/media and coalescence effects.

Nonetheless, a disadvantage identified for the proposed invention is the non-uniform pen nozzle usage that arises from the ramp profile. This may necessitate pre-mature disposal of pens, and so the implementation of the invention may therefore be implemented as a user selectable criterion in deciding how high quality print modes should be implemented.

What is claimed is:

1. A printer comprising:

a scan axis arranged to receive at least one pen, each pen comprising an array of ink ejection elements adapted to print a swath on a printing medium; and printer control circuitry, responsive to selection of a multi-pass print mode, to cause a printing medium advance mechanism to incrementally advance the printing medium past the pens in a printing advance direction (PAD) between the printing of a first swath and a second swath so that, in use, a first group of ink ejection elements dispenses ink in a swath along respective rows on said printing medium with at least one other group of corresponding ink ejection elements dispensing ink along said rows in subsequent swaths, said printer control circuitry further causing said at least one pen to move across said printing medium at a speed providing a pre-determined drop-to-drop interval and said scan axis being arranged to receive one of said at least one pen which dispenses an ink with a relaxation time which is a function of the characteristics of said printing medium and the amount of ink being dispensed;

said printer control circuitry being arranged to cause said first group of ink ejection elements to dispense proportionally more ink per swath than said at least one other group of ink ejection elements in subsequent swaths; and said drop-to-drop interval being comparable to said relaxation time.

2. A printer as claimed in claim 1 wherein said printer control circuitry is arranged to ensure said relaxation time is greater than said drop-to-drop interval.

3. A printer as claimed in claim 1 wherein said printer control circuitry is arranged to control the amount of ink dispensed in subsequent passes to ensure that the wetness of the printing medium in any given pass is substantially the same within said pass.

4. A printer as claimed in claim 1 wherein said printer control circuitry is arranged to cause said first and said at least one other groups of ink ejection elements to dispense ink in a swath so that other groups of ink ejection elements in subsequent swaths dispense ink onto rows on said printing medium having near homogeneous conditions of dryness.

5. A printer as claimed in claim 1 wherein said printer control circuitry is arranged to cause ink ejection elements in groups disposed towards respective ends of said array to dispense proportionally less ink than ink ejection elements within the remainder of the same group of ink ejection elements.

6. A printer as claimed in claim 5 wherein said printer control circuitry is arranged to cause the ink ejection elements corresponding to ink ejection elements in groups disposed towards respective ends of said array to dispense proportionally more ink than ink ejection elements within the remainder of the same group of ink ejection elements.

7. A printer as claimed in claim 1 wherein said multi-pass print mode is a four pass print mode, and wherein said printing medium advance mechanism is arranged to advance the printing medium past the pens in four increments per swath, and wherein said printer control circuitry is arranged to cause a first and second group of ink ejection elements to dispense a predetermined amount of ink, to cause a third group of ink ejection elements to dispense a lesser amount of ink, and to cause a fourth group of ink ejection elements to dispense a least amount of ink.

8. A printer as claimed in claim 1 wherein said multi-pass print mode is a six pass print mode, and wherein said printing medium advance mechanism is arranged to advance the printing medium past the pens in six increments per swath, and wherein said printer control circuitry is arranged to cause a first, second and third group of ink ejection elements to dispense a pre-determined amount of ink, to cause a fourth group of ink ejection elements to dispense a lesser amount of ink, to cause a fifth group of ink ejection elements to dispense a still lesser amount of ink, and to cause a sixth group of ink ejection elements to dispense a least amount of ink.

9. A printer as claimed in claim 1 wherein the proportions of ink being dispensed by ink injection elements of each of said at least one pen are defined in respective profiles.

10. A printer as claimed in claim 9 wherein said printer control circuitry is arranged to cause ink ejection elements of one pen on said scan axis to dispense ink according to a different profile to ink ejection elements of other pens on said scan axis.

11. A printer as claimed in claim 9 wherein said printer control circuitry is arranged to employ said profiles to determine a print mask for a pen, said printer control circuitry being responsive to said print mask and to print data to determine if a pen should dispense ink at a point on the printing medium.

12. A method of printing with a printer of the type comprising a scan axis arranged to receive at least one pen, each pen comprising an array of ink ejection elements, wherein the method comprises the steps:

responsive to selection of a multi-pass print mode, causing a printing medium advance mechanism to incrementally advance the printing medium past the pens in a printing advance direction (PAD) between the printing of a first swath and a second swath so that a first group of ink ejection elements dispenses ink in a swath along respective rows on said printing medium with at least one other group of corresponding ink ejection elements dispensing ink along said rows in subsequent swaths;

moving said at least one pen across said printing medium at a speed providing a pre-determined drop-to-drop interval, said at least one pen dispensing an ink with a relaxation time which is a function of the characteristics of said printing medium and the amount of ink being dispensed and said drop-to-drop interval being comparable to said relaxation time; and causing said first group of ink ejection elements to dispense proportionally more ink per swath than said at least one other group of ink ejection elements in subsequent swaths.

13. A computer program product comprising printer control software for controlling a printer of the type comprising a scan axis arranged to receive at least one pen, each pen comprising an array of ink ejection elements, wherein the program comprises instructions effective to cause the printer to perform the steps:

responsive to selection of a multi-pass print mode, causing a printing medium advance mechanism to incrementally advance the printing medium past the pens in a printing advance direction (PAD) between the printing of a first swath and a second swath so that a first group of ink ejection elements dispenses ink in a swath along respective rows on said printing medium with at least one other group of corresponding ink ejection elements dispensing ink along said rows in subsequent swaths;

moving said at least one pen across said printing medium at a speed providing a pre-determined drop-to-drop interval, said at least one pen dispensing an ink with a relaxation time which is a function of the characteristics of said printing medium and the amount of ink being dispensed and said drop-to-drop interval being comparable to said relaxation time; and causing said first group of ink ejection elements to dispense proportionally more ink per swath than said at least one other group of ink ejection elements in subsequent swaths.

14. A printer comprising:

a scan axis arranged to receive at least one pen, each pen comprising an array of ink ejection elements adapted to print a swath on a printing medium; and printer control circuitry, responsive to selection of a multi-pass print mode, to cause a printing medium advance mechanism to incrementally advance the printing medium past the pens between swaths; said printer control circuitry being arranged to move said at least one pen across said printing medium at a speed providing a pre-determined drop-to-drop interval and wherein said scan axis is arranged to receive one of said at least one pen which dispenses an ink with a relaxation time being a function of at least the characteristics of said printing medium and the amount of ink being dispensed; and wherein said printer control circuitry controls the amount of ink being dispensed to ensure said relaxation time is greater than said drop-to-drop interval.

\* \* \* \* \*